2,984,915
OPTICAL SIMULATOR FOR RADAR PREDICTION

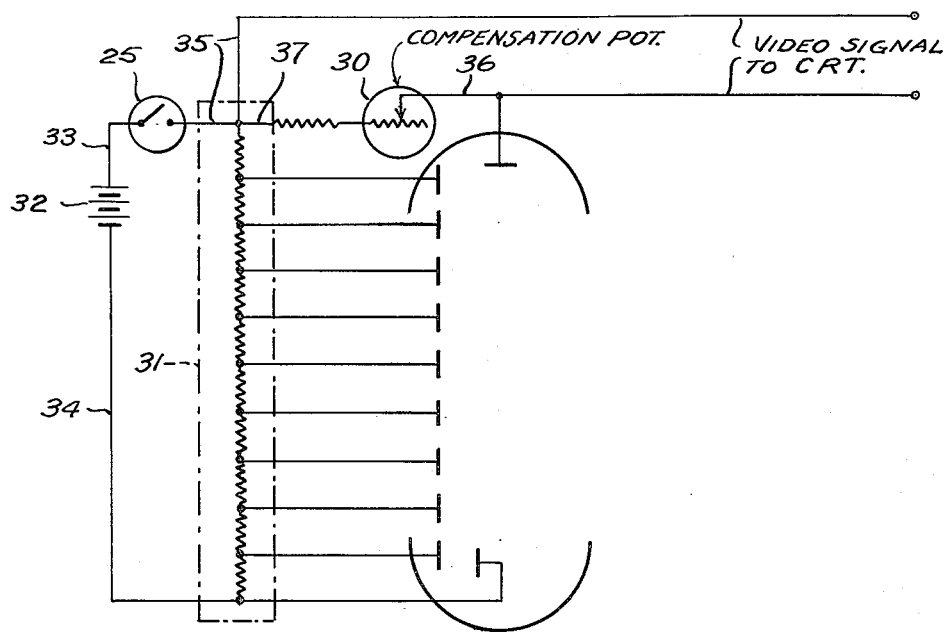
Fig. 2.
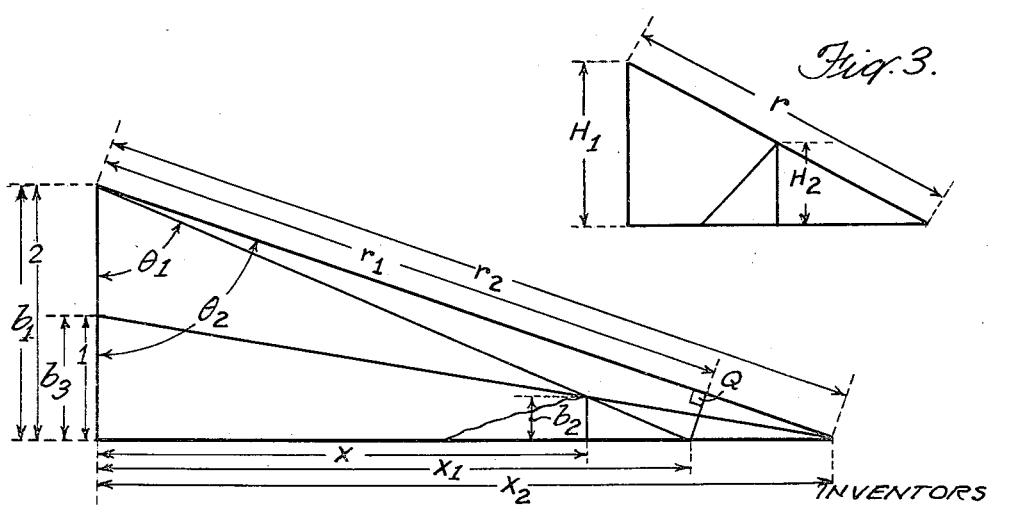
Fig. 3.
Fig. 3a.
INVENTORS
HERBERT W. BOMZER
BENJAMIN SENITZKY
FLEUR W. SMITH
BY Bosst & Bosst
ATTORNEYS United States Patent Office 2,984,915
Patented May 23, 1961

Herbert W. Bomzer, New Hyde Park, N.Y., Benjamin Senitzky, Murray Hill, N.J., and Fleur W. Smith, Los Angeles, Calif., assignors to Sperry Rand Corporation, Ford Instrument Company Division, Long Island City, N.Y., a corporation of Delaware Filed Nov. 28, 1956, Ser. No. 624,848

4 Claims. (Cl. 35—10.4)

This invention relates to an optical device for producing video and synchronizing sweep signals for cathode ray tube so as to simulate and predict a radar scope presentation of a known target.

In the past radar trainers have been developed to provide radar simulation of land-water boundaries and mountainous terrain. These have had to employ specially designed reflection and specially coded maps entailing complicated processing for city areas. The trainer contemplated by this invention is adapted to be used with appropriate indicator devices to yield accurate PPI radar like pictures of urban developments from scale models, such as etched glass relief maps, which are comparatively easy to construct.

In general, this invention provides a source of optical illumination mounted on a platform rotatable on a vertical axis and a photocell pickup disposed on the same platform directly above the light source and rotatable on a horizontal axis so that a model of the area can be scanned and presented on a cathode ray tube such as the area itself would be indicated on a PPI screen of a radar. Means for synchronizing the azimuth and the radial scan of the photocell and the sweep signal for the C.R.T. are, of course, provided. Additional means are provided for shutting off the electron beam in the cathode ray tube on the return sweep of the radial scan cycle and compensating for the attenuation of light with slant range.

The problem frequently encountered in radar trainers which use a light source as the source of radiation is the accurate simulation and duplication of shadow effect on the cathode ray tube of the trainer so that the trainer can be operated to predict the length of the shadows on the cathode ray tube of a radar which is located over an actual target area. Shadow length errors occur because the light source and the light receiver must necessarily be located at different positions. Applicant's solution to this problem is to mount the light source and light receiver in a plane which is vertically disposed relative to the plane of the illuminated model target. Additionally, it has been found that when the target height on the model is small compared to the height of the light source, such as is expected to be the case when the model is etched glass, the ratio of receiver height to light source height should be two to one for maximum accuracy. The light source is therefore preferably located at approximately half the height of the receiver with respect to the base of the trainer in the plane of which the model target is disposed. The proof of these means for reducing error assumes a selected scanning rate and is theoretically derived hereinafter.

Various advantages and features of the invention may be perceived on reading the detailed description in conjunction with the accompanying drawings, in which, Fig. 1 is a block diagram showing a system for producing a video signal and synchronized sweep signals;

Fig. 2 shows a photocell slant range compensation circuit; and

Figs. 3 and 3a are geometric figures employed to establish geometrically the prescribed location of the photocell relative to the light source in the trainer for accurate radar prediction.

Figure 1:
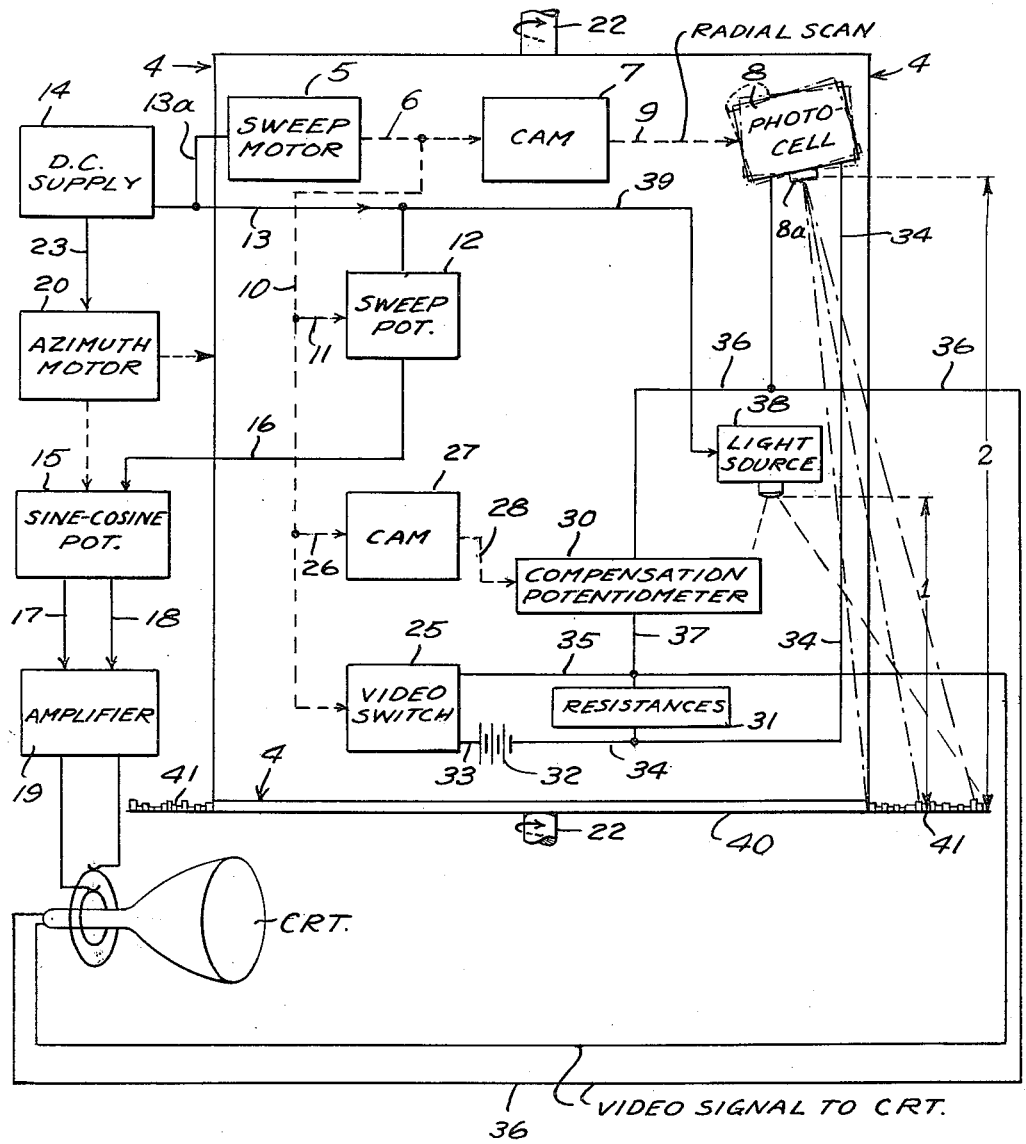

According to the block diagram there is provided a plate 4 having a sweep motor 5 mounted thereon. Motor shaft 6 is in driving connection with a cam 7 which is connected through shaft 9 to photocell 8 the output of which is employed to energize a cathode ray tube. The photocell 8 is mounted on a horizontal axis (not shown) and has a small rectangular and directionally selective aperture 8$^a$ of almost .0050 square inch in area so that selected areas of the model can be scanned in a prescribed way; it is reciprocally rotated by the cam 7 which provides a constant ground range radial scan rate. The forward and return scan should each require fifteen seconds.

A shaft 10 driven by the shaft 6 and connected shaft 11 is employed to drive sweep potentiometer 12 which is energized by output conductor 13 of D.C. voltage supply 14. A conductor 13$^a$ connects the conductor 13 to the motor. The sweep potentiometer energizes a sine-cosine potentiometer 15 of the C.R.T. sweep circuit by feeding a sawtooth signal to the sine and cosine potentiometer 15 on lead 16. The sine-cosine potentiometer has a pair of output leads 17 and 18 connected to amplifier 19 for the PPI type indicator tube C.R.T. The magnitude of the sawtooth signal is proportioned to the displacement of the sweep motor shaft 6 resulting in a radial synchronization between the electron beam in the C.R.T. and the portion of the target model area being scanned by the light source and the photocell.

The sine-cosine potentiometer is mechanically driven by an azimuth motor 20 through a planetary gear system (not shown) simultaneously with the plate 4 on which the optical units and their associated components are mounted. The plate 4 is mounted on shaft 22 which provides a vertical turning axis therefor. The azimuth motor 20 is connected to the D.C. supply 14 by means of lead 23. The purpose of this arrangement is to provide azimuth synchronization between the electron beam and the scanning light source and the photocell receiver.

The sweep motor 5 also drives a video switch 25 by means of shaft 10 and, through driven shaft 26, cam 27 and shaft 28, additionally drives a compensation potentiometer 30. As shown in Fig. 2 the plate, grid and cathode elements of the photocell 8 are biased by a resistive circuit 31 which is connected across battery 32 and the video switch 25. The video switch 25 is connected to one side of the battery by lead 33. A lead 34 connects the other side of the battery to one side of the resistive circuit 31 and the cathode of the photocell, and a lead 35 connects the video switch to the other side of the resistive circuit of the photocell. The compensation potentiometer is driven by shaft 28 and provides a resistance in photocell plate biasing an output circuit 36 which is proportional to the square of the slant range from the photocell to the target model being scanned. This resistance appears in the photocell output circuit and compensates for the attenuation of the reflected light with slant range. The video switch is operated by a cam (not shown) to shut off the photocell and thereby cut off its output to the cathode ray tube on the return sweep of the scan cycle (long to short range).

A source of beam illumination 38 is mounted on the plate 4 and is powered by lead 39 which is connected to lead 13. The source 38 provides illumination over a reasonably broad area toward which it is directed. The location of the light source with respect to the photocell receiver is deemed to be critical for accurate radar prediction. A major cause of poor results in optical trainers has been a consequence of the fact that shadow positions and shadow lengths are in error. This occurs because the light source and receiver are at different positions. The errors become very large when the target height on the scale model is substantial compared to the height of the source above the model. It is expected that better results will be obtained with glass etched city models. Preferably, the photocell 8 is disposed above the light source 38 and at twice the height of the source with respect to the model. That is, the light source is mounted at one half the distance of the aperture of the photocell from the bottom edge 40 of the plate 4, the bottom edge 40 of the plate being situated substantially in the base plane 41 of the etched glass model which is stationary and circumferentially disposed about the rotatable plate 4. With this relative arrangement of the light source and light receiver, the length of the shadows on the C.R.T. will accurately reflect or predict the length of the shadows on the actual radar screen. Shadow represents the time during which no target reflected energy is sensed by the radar and has been difficult to duplicate in optical trainers. That accurately predicted shadows may be obtained by a system having critically located optical elements as described above may be mathematically demonstrated as follows:

As shown in Fig. 3 in the idealized radar case, the length of the shadow on the PPI is:

$$S = \frac{a}{M} \cdot \frac{H_2}{H_1} \cdot r$$

where $$K = \frac{a}{M}$$

$a$: scope radius
$M$: maximum range of radar
$H_1$: aircraft altitude
$H_2$: height of target
$r$: slant range to the end of the target shadow on the ground.

As shown in Fig. 3a $b_1$ is the receiver height, represents the scaled aircraft altitude
$b_2$ represents the scaled target altitude
$b_3$ is the source of illumination.
$r_1$ is the slant range from the receiver to the ground at the beginning of the time interval during which shadow or no target is sensed by the cathode ray tube.
$r_2$ is the slant range from the receiver to the ground at the end of the time interval during which shadow or no target is sensed by the cathode ray tube.

As shown in Fig. 3a, the shadow on the C.R.T. will be proportional to $r_2 - r_1$. It is convenient to approximate this distance by assuming the angle at Q to be 90°.

From Fig. 3a it follows that $$r_2 - r_1 = (X_2 - X_1) \sin \theta_2$$

but $$X_1 = \frac{Xb_1}{b_1 - b_2} \text{ and } X_2 = \frac{Xb_3}{b_3 - b_2}$$

Substituting $$r_2 - r_1 = X \left( \frac{b_3}{b_3 - b_2} - \frac{b_1}{b_1 - b_2} \right) \sin \theta_2$$

replacing X by its equivalent $$r_2 - r_1 = r_1 \left(1 - \frac{b_2}{b_1}\right) \left( \frac{b_3}{b_3 - b_2} - \frac{b_1}{b_1 - b_2} \right) \sin \theta_1 \sin \theta_2$$

If $\sin \theta_1 \sin \theta_2 = 1$ (i.e., if both $\theta_1$ and $\theta_2$ are greater than 72°, for example, the approximation introduces an error of less than 10%) then $$r_2 - r_1 \sim r_1(1 - b_2/b_1) \left( \frac{1}{1 - b_2/b_3} - \frac{1}{1 - b_2/b_1} \right)$$

$$\sim r_1 \left( \frac{1}{1 - b_2/b_3} \right) (1 - b_2/b_1 - 1 + b_2/b_3)$$

Replace $$\frac{1}{1 - b_2/b_3}$$

by its equivalent expansion, where terms of the second order and greater are neglected.

$$r_2 - r_1 \sim r_1(1 + b_2/b_3)(b_2/b_3 - b_2/b_1)$$

Again neglecting second order terms $$r_2 - r_1 \sim r_1 b_2 (1/b_3 - 1/b_1)$$

It follows that $s$, the length of the shadow on the C.R.T., is:

$$s = \frac{a}{m}(r_2 - r_1) = \frac{a}{m} r_1 b_2 (1/b_3 - 1/b_1)$$

where $m$ is the maximum range at which shadows can be produced by the trainer.

Let the scale factor be $k$ $$M = km, \ H_1 = kb_1, \ H_2 = kb_2, \ r = kr_1$$

The implied condition is $s = S$ $$\therefore \frac{s}{S} = 1 = \frac{(1/b_3 - 1/b_1)}{1/b_1}$$

whence $$b_3 = b_1/2$$

Various modifications may be made in the optical radar trainer as described above without departing from the principle of invention, such as a provision for adjustably mounting the light source and light receiver for adapting the trainer to models of different scale factor.

What is claimed is:

1. An optical radar trainer comprising a scale model disposed on a base plane, a plate mounted to rotate on an axis disposed normal to the plane of said scale model, a video signal producing photocell rotatably mounted on said plate and on an axis disposed ninety degrees to said plate axis, a sweep motor and cam connected to said rotatably mounted photocell for reciprocally rotating said photocell and causing said photocell to radially scan said scale model at a constant ground range radial scan rate, a source of beam illumination being located on said plate at substantially one half the height of said photocell with respect to the base plane of said scale model, an azimuth motor operatively connected to said plate for rotating the plate on its said axis in azimuth, and means connected to said sweep motor and said azimuth motor for producing sweep signals synchronized with the radial and azimuth scan of said photocell.

2. An optical trainer as claimed in claim 1 wherein there is provided a compensation potentiometer connected to said photocell and means connected to said sweep motor and said compensation potentiometer for driving said potentiometer in accordance with the radial scan of said photocell, whereby a resistance is introduced in the photocell circuit to compensate for the attenuation of light with slant range.

3. An optical trainer as claimed in claim 2 wherein there is provided a video switch which is in driven connection with said sweep motor and in electrical connection with the photocell circuit whereby it may be opened on each return sweep of the radial scan cycle.

4. An optical trainer as claimed in claim 3 wherein said means connected to said sweep motor and said azimuth motor for producing sweep signals synchronized with the radial and azimuth scan of said photocell includes a sweep potentiometer driven by said sweep motor and a sine-cosine potentiometer connected to said azimuth motor and said sweep potentiometer.

(References on following page)

References Cited in the file of this patent

UNITED STATES PATENTS

| | | |
|---|---|---|
| 2,405,591 | Mason | Aug. 13, 1946 |
| 2,639,421 | Miller | May 19, 1953 |
| 2,705,769 | Cooper | Apr. 5, 1955 |
| 2,740,205 | Shamis et al. | Apr. 3, 1956 |
| 2,788,588 | Lindley | Apr. 16, 1957 |

FOREIGN PATENTS

| | | |
|---|---|---|
| 1,112,440 | France | Nov. 16, 1955 |